(12) United States Patent
Yalunin

(10) Patent No.: US 9,787,763 B2
(45) Date of Patent: Oct. 10, 2017

(54) METHOD OF AND SYSTEM FOR DETECTING SPAM ACTIVITY IN A CLOUD SYSTEM

(71) Applicant: YANDEX EUROPE AG, Lucerne (CH)

(72) Inventor: Evgeny Viktorovich Yalunin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/515,705

(22) PCT Filed: Feb. 4, 2016

(86) PCT No.: PCT/IB2016/050564
§ 371 (c)(1),
(2) Date: Mar. 30, 2017

(87) PCT Pub. No.: WO2017/001945
PCT Pub. Date: Jan. 5, 2017

(65) Prior Publication Data
US 2017/0264673 A1        Sep. 14, 2017

(30) Foreign Application Priority Data

Jun. 30, 2015   (RU) ................................ 2015125965

(51) Int. Cl.
*H04L 29/08*      (2006.01)
*G06F 21/62*      (2013.01)
*H04L 29/06*      (2006.01)

(52) U.S. Cl.
CPC .......... *H04L 67/10* (2013.01); *G06F 21/6218* (2013.01); *H04L 65/1079* (2013.01); *H04L 29/06346* (2013.01)

(58) Field of Classification Search
CPC .............. H04L 63/10; H04L 29/06346; H04L 65/1079; G06F 21/6218
See application file for complete search history.

(56) References Cited

U.S. PATENT DOCUMENTS 4,849,879 A    7/1989  Chinnaswamy et al.
6,526,370 B1   2/2003  Yu et al.
(Continued)

FOREIGN PATENT DOCUMENTS

RU    2346412 C2     2/2009
WO    0055741 A1     9/2000
WO    2014011492 A1  1/2014

OTHER PUBLICATIONS

Stein, Tao, Erdong Chen, and Karan Mangla. "Facebook immune system." Proceedings of the 4th Workshop on Social Network Systems. ACM, 2011.*

(Continued)

*Primary Examiner* — Jimmy H Tran
(74) *Attorney, Agent, or Firm* — BCF LLP

(57) ABSTRACT

There are provided a method and a system for detecting and blocking spam activity in a cloud system. The method can be executed at a server. The method comprises receiving from a first user of the plurality of users of the cloud service an indication of a first sharing action for sharing access to the digital object; responsive to the first indication, increment a sharing counter value of a sharing counter dedicated to the digital object; receiving from a second user of the plurality of users of the cloud service an indication of a second sharing action for sharing access to the digital object; responsive to the second indication further incrementing the sharing counter value of the sharing counter dedicated to the digital object; responsive to the sharing counter value reach- (Continued)

ing a pre-determined threshold value, executing a spam preventive action associated with the digital object.

20 Claims, 6 Drawing Sheets

(56) References Cited

U.S. PATENT DOCUMENTS

| | | | | |
|---|---|---|---|---|
| 6,769,016 | B2* | 7/2004 | Rothwell | H04L 51/12 706/20 |
| 7,555,621 | B1 | 6/2009 | Pavlyushchik | |
| 7,725,545 | B2* | 5/2010 | Rusche | H04L 51/12 709/206 |
| 8,108,412 | B2* | 1/2012 | Patterson | G06F 17/30864 707/754 |
| 8,280,844 | B2* | 10/2012 | Warn | G06F 21/55 707/607 |
| 8,359,652 | B2* | 1/2013 | Bhagwan | G06F 21/604 726/1 |
| 8,489,628 | B2* | 7/2013 | Patterson | G06F 17/30864 707/767 |
| 8,582,567 | B2* | 11/2013 | Kurapati | H04L 29/06027 370/352 |
| 8,826,434 | B2* | 9/2014 | Merza | H04L 63/1441 726/23 |
| 8,953,471 | B2* | 2/2015 | Boland | H04L 47/2483 370/252 |
| 9,031,883 | B2* | 5/2015 | Agashe | G06Q 50/01 706/12 |
| 9,037,573 | B2* | 5/2015 | Patterson | G06F 17/30864 707/722 |
| 9,059,950 | B2* | 6/2015 | Greenzeiger | H04L 41/5093 |
| 9,299,076 | B2* | 3/2016 | Wiltzius | G06Q 30/018 |
| 9,509,715 | B2* | 11/2016 | Bach | H04L 63/1483 |
| 9,558,279 | B2* | 1/2017 | Agashe | G06Q 50/01 |
| 9,569,505 | B2* | 2/2017 | Patterson | G06F 17/30864 |
| 2009/0132669 | A1 | 5/2009 | Milliken et al. | |
| 2011/0107418 | A1* | 5/2011 | Bhagwan | G06F 21/604 726/22 |
| 2011/0202500 | A1* | 8/2011 | Warn | G06F 21/55 707/607 |
| 2012/0136936 | A1 | 5/2012 | Quintuna et al. | |
| 2012/0159564 | A1 | 6/2012 | Spektor et al. | |
| 2012/0173655 | A1 | 7/2012 | McEntee | |
| 2013/0024424 | A1 | 1/2013 | Prahlad et al. | |
| 2013/0103901 | A1 | 4/2013 | Ooi | |
| 2013/0176865 | A1* | 7/2013 | Boland | H04L 47/2483 370/252 |
| 2013/0226908 | A1 | 8/2013 | Risher et al. | |
| 2013/0267470 | A1 | 10/2013 | Tymianski et al. | |
| 2013/0282830 | A1 | 10/2013 | Besen et al. | |
| 2013/0303204 | A1* | 11/2013 | Dudley | H04W 12/12 455/466 |
| 2013/0318603 | A1* | 11/2013 | Merza | H04L 63/1441 726/22 |
| 2014/0007090 | A1 | 1/2014 | Rugina et al. | |
| 2014/0020108 | A1 | 1/2014 | John et al. | |
| 2014/0095412 | A1* | 4/2014 | Agashe | G06Q 50/01 706/12 |
| 2014/0129668 | A1* | 5/2014 | Greenzeiger | H04L 41/5093 709/217 |
| 2014/0129942 | A1* | 5/2014 | Rathod | H04N 21/44222 715/720 |
| 2014/0181198 | A1 | 6/2014 | Motes et al. | |
| 2015/0020196 | A1 | 1/2015 | Wijbrans et al. | |
| 2015/0040217 | A1 | 2/2015 | Abuelsaad et al. | |
| 2015/0180893 | A1* | 6/2015 | Im | H04L 63/1416 726/23 |
| 2015/0199444 | A1* | 7/2015 | Agashe | G06Q 50/01 706/12 |
| 2015/0213456 | A1* | 7/2015 | Wiltzius | G06Q 10/107 705/317 |
| 2017/0098006 | A1* | 4/2017 | Agashe | G06F 17/30867 |

OTHER PUBLICATIONS

Damiani, Ernesto, et al. "P2P-based collaborative spam detection and filtering." Peer-to-Peer Computing, 2004. Proceedings. Proceedings. Fourth International Conference on. IEEE, 2004.*
Jansen, Wayne, and Timothy Grance. "Sp 800-144. guidelines on security and privacy in public cloud computing." (2011).*
Khorshed, Md Tanzim, ABM Shawkat Ali, and Saleh A. Wasimi. "A survey on gaps, threat remediation challenges and some thoughts for proactive attack detection in cloud computing." Future Generation computer systems28.6 (2012): 833-851.*
Zargar, Saman Taghavi, Hassan Takabi, and James BD Joshi. "DCDIDP: A distributed, collaborative, and data-driven intrusion detection and prevention framework for cloud computing environments." Collaborative computing: Networking, applications and worksharing (collaboratecom), 2011 7th international conference on. IEEE, 2011.*
Wang, Alex Hai. "Don't follow me: Spam detection in twitter." Security and Cryptography (SECRYPT), Proceedings of the 2010 International Conference on. IEEE, 2010.*
Jin, Xin, et al. "A data mining-based spam detection system for social media networks." Proceedings of the VLDB Endowment 4.12 (2011): 1458-1461.*
Mccord, Michael, and M. Chuah. "Spam detection on twitter using traditional classifiers." international conference on Autonomic and trusted computing. Springer, Berlin, Heidelberg, 2011.*
International Search Report from PCT/IB2016/050564, dated May 16, 2016.
English Translation of Description and Claims of CN102916947 retrieved on Epodoc/EPO on May 13, 2015.
International Preliminary Report on Patentability from PCT/IB2016/050564, dated Nov. 17, 2016.

* cited by examiner

METHOD OF AND SYSTEM FOR DETECTING SPAM ACTIVITY IN A CLOUD SYSTEM

CROSS-REFERENCE

The present application claims priority to Russian Patent Application No 2015125965, filed Jun. 30, 2015, entitled "METHOD OF AND SYSTEM FOR DETECTING SPAM ACTIVITY IN A CLOUD SYSTEM" the entirety of which is incorporated herein.

FIELD OF THE TECHNOLOGY

The present technology relates to cloud services network in general and, specifically, to a method of and a system for detecting spam activity in a cloud service.

BACKGROUND

Today, a large percentage of electronic computations and electronic content management operations are performed by cloud platforms. Cloud platforms deliver computing as a service to one or more clients. A cloud platform may provide users with a cloud service allowing users to upload, store, and share files or other electronic content using remote servers. Typically, a user may use a cloud service to store files for a multitude of purposes, such as data archival, ease of access to the file irrespective of location, time or electronic device used for accessing the file, sharing of the file with other users, and the like. A variety of files may be stored on a cloud service, including files used for personal or professional use, such as data files, portable document format (pdf) files, word processing files, text files, images, photographs, multimedia content for entertainment purposes, and the like.

For example, a user may operate in various contexts, wherein in each of them the user plays a different role and has different responsibilities. These different roles might relate to the professional or personal life of the user in the role of employee, contractor, customer, supplier, or family member, for example. Within these various contexts, a user may use different user electronic devices (e.g., desktop computers, laptop computers, personal computers, mobile phones, tablets, etc.) or user electronic devices that utilize remote processing capability (e.g., applications hosted on a web site or a virtual machine hosted in a data center). Different computing environments might be installed on user electronic devices with local processing capabilities (e.g., different operating systems, virtual software environments, Web applications, native applications, containers, BIOS/APIs, etc.) to interact with a cloud platform.

Further, various global or local communications networks (the Internet, the World Wide Web, local area networks, and the like) offer a user a vast amount of information. The information includes a multitude of contextual topics, such as but not limited to, news and current affairs, maps, company information, financial information and resources, traffic information, games and entertainment-related information. Users use a variety of user electronic devices (desktop computers, laptop computers, notebooks, smartphones, tablets, and the like) to have access to rich content (such as images, audio, video, animation, and other multimedia content from such networks).

Generally speaking, a given user can access computing services on a cloud platform regardless of pre-determined hardware/software systems and communications networks in use. A user can access a cloud platform via a communications network by two principle means. A given user can access a particular resource directly, either by typing an address of the resource (typically a Universal Resource Locator (URL), such as www.webpage.com) or by clicking a link in an e-mail or in another web resource.

A given user may use a cloud platform for file storage purposes. Typically, a user may use a cloud storage service to store files for a multitude of purposes, such as data archival, ease of access to the file irrespective of location or time, sharing of the file with other users, and the like. A variety of files may be stored on a cloud storage service, including files used for personal or professional use, such as data files, portable document format (pdf) files, word processing files, text files, images, photographs, multimedia content for entertainment purposes, and the like.

In cloud storage services, various problems have to be solved by a cloud service provider. One of such problems is spam distribution performed by malicious users or malicious software. Spammers or malicious software may use infrastructure of the cloud storage service to distribute advertising content, viruses, sniffers, other harmful software, and other types of digital content deemed to be harmful or unwanted by ordinary users of the cloud storage service or considered such by the administrators of the cloud storage service. It is important therefore for a cloud storage service to be able to quickly detect and react to spam attacks and mass distribution of harmful software and other unwanted digital content items.

SUMMARY

It is thus an object of the present technology to ameliorate at least some of the inconveniences present in the prior art.

It could be the case that a malicious user or a software program may create multiple fake accounts in a cloud storage service or fraudulently gain access to multiple accounts of real users of the cloud storage service in order to use them to upload copies of a spam digital object (file or folder) into the cloud storage service. The digital object may then be distributed from multiple accounts among the users via sharing functionality of the cloud storage service.

Embodiments of the present technology have been developed based on inventors' appreciation that there is a need for systems and methods for preventing sharing functionality of personal cloud storage services from being used for distribution of spam, harmful software and other types of unwanted digital content.

As such, according to a first broad aspect of the present technology, there is provided a method of detecting spam activity in a cloud service. The cloud service is hosted on a server which has a digital object stored thereon. The server is accessible, via a communication network, by a plurality of users of the cloud service. The method is executable by the server. The method comprises: receiving from a first user of the plurality of users of the cloud storage service an indication of a first sharing action for sharing access to the digital object; responsive to the first indication, incrementing a sharing counter value of a sharing counter dedicated to the digital object; receiving from a second user of the plurality of users of the cloud storage service an indication of a second sharing action for sharing access to the digital object; responsive to the second indication further incrementing the sharing counter value of a sharing counter dedicated to the digital object; responsive to the sharing counter value reaching a pre-determined threshold value, executing a spam preventive action associated with the digital object.

In some implementations of the method, each one of the first user and the second user is respectively associated with a first user account and a second user account in a cloud service.

In some implementations of the method, the digital object is one of: a file, a folder containing at least one file.

In some implementations of the method, the digital object has been previously uploaded by at least one of the first user and the second user.

In some implementations of the method, both the first user and the second user have access to the digital object.

In some implementations of the method, the sharing action includes at least one of: generating a public link associated with the digital object; sending a public link associated with the digital object to one or more public users; sending to one or more invited users an invitation to join a shared access to the digital object.

In some implementations of the method, the sharing counter is additionally configured to be incremented responsive to at least one of: (i) an invited user accepting an invitation to join the shared access to the digital object and (ii) a public user accessing the digital object through the public link associated with the digital object.

In some implementations of the method, prior to the receiving from the first user of the plurality of users of the cloud service the indication of the first sharing action, the method further comprises: receiving from the first user a first upload action for a first version of the digital object; receiving from the second user a second upload action for a second version of the digital object; executing a de-duplication process to store a single instance of the digital object, the single instance accessible to both the first user and the second user.

In some implementations of the method, de-duplication process further comprises storing only the single instance of the digital object on the server.

In some implementations of the method, de-duplication process comprises: responsive to determining that the first version of the digital object and the second version of the digital object are the same, discarding a selected one of the first version of the digital object and the second version of the digital object, the selected one being a later received version of the digital object.

In some implementations of the method, during the de-duplication process each of a first user account associated with the first user and a second user account associated with the second user are assigned a link pointing to the single instance of the digital object.

In some implementations of the method, the digital object is a first digital object, and the sharing counter is a first sharing counter, and the server has a second digital object stored therein, the second digital object having a second sharing counter associated therewith, and the first sharing counter and the second sharing counter are incremented independently therebetween in response to sharing actions associated with their associated first digital object and second digital object.

In some implementations of the method, the spam preventive action comprises at least one of: transmitting an indication of the digital object and the associated sharing actions to a human assessor; blocking the digital object for sharing; blocking the digital object for access; deleting the digital object; blocking at least one user account of one of the first user and the second user; sending a warning notification to one of the first user and the second user; sending a notification indicating a potential spam distribution to public users; sending a notification indicating a potential spam distribution to users invited to join a shared access to the digital object.

In some implementations of the method, the method further comprises, prior to the executing a spam preventive action associated with the digital object, executing an assessment routine to determine an individual sharing counter associated with the first user and an individual sharing counter associated with the second user.

In some implementations of the method, the sharing counter dedicated to the digital object is associated with a time parameter.

In some implementations of the method, the time parameter is indicative of a time taken to reach the sharing counter value of the sharing counter.

In some implementations of the method, the time parameter is indicative of an average incrementing speed of the sharing counter.

In some implementations of the method, the method further comprises prior to the executing a spam preventive action associated with the digital object, assessing the time parameter associated with the sharing counter dedicated to the digital object.

In some implementations of the method, the step of assessing the time parameter associated with the sharing counter comprises comparing the time parameter to a time parameter threshold value.

In some implementations of the method, the method further comprises executing a spam preventive action associated with the digital object only responsive to the time parameter exceeding the time parameter threshold value.

In some implementations of the method, the method further comprises executing a spam preventive action associated with the digital object only responsive to the time parameter threshold value exceeding the time parameter.

In some implementations of the method, the cloud service is a cloud storage service.

In accordance with another broad aspect of the present technology there is provided a server configured to detect spam activity in a cloud service. The server comprises: a communication interface for communication with an electronic device via a communication network, the electronic device being associated with one of a plurality of users of a cloud service provided by the server; an interface module; a user account module; a storage unit; a processor operationally connected with the communication interface, the user interface module, the user account module and the storage unit, the processor configured to cause the memory module to store a digital object, the processor being further configured to: receive from a first user of the plurality of users of the cloud service an indication of a first sharing action for sharing access to the digital object; responsive to the first indication, increment a sharing counter value of a sharing counter dedicated to the digital object; receive from a second user of the plurality of users of the cloud service an indication of a second sharing action for sharing access to the digital object; responsive to the second indication further increment the sharing counter value of the sharing counter dedicated to the digital object; responsive to the sharing counter value reaching a pre-determined threshold value, execute a spam preventive action associated with the digital object.

In some implementations of the server, the processor is further configured to associate each one of the first user and the second user respectively with a first user account and a second user account in a cloud service.

In some implementations of the server, the digital object is one of: a file; a folder containing at least one file.

In some implementations of the server, the digital object has been previously uploaded to the server by at least one of the first user and the second user.

In some implementations of the server, the processor is further configured to provide both the first user and the second user with access to the digital object.

In some implementations of the server, the sharing action includes at least one of: generating a public link associated with the digital object; sending a public link associated with the digital object to one or more public users; sending to one or more invited users an invitation to join a shared access to the digital object.

In some implementations of the server, the sharing counter is additionally configured to be incremented responsive to at least one of: an invited user accepting an invitation to join the shared access to the digital object; a public user accessing the digital object through the public link associated with the digital object.

In some implementations of the server, the processor is further configured to, prior to the receiving from the first user of the plurality of users of the cloud service the indication of the first sharing action: receive from the first user a first upload action for a first version of the digital object; receive from the second user a second upload action for a second version of the digital object; execute a de-duplication process to store a single instance of the digital object, the single instance accessible to both the first user and the second user.

In some implementations of the server, the processor is further configured to store only the single instance of the digital object on the server during de-duplication process.

In some implementations of the server, the processor is further configured to execute the de-duplication process such that: responsive to determining that the first version of the digital object and the second version of the digital object are the same, discard a selected one of the first version of the digital object and the second version of the digital object, the selected one being a later received version of the digital object.

In some implementations of the server, the processor is further configured to assign a link pointing to the single instance of the digital object to each of a first user account associated with the first user and a second user account associated with the second user during the de-duplication process.

In some implementations of the server, the digital object is a first digital object, the sharing counter is a first sharing counter, and the processor is further configured to store a second digital object, the second digital object having a second sharing counter associated therewith, and the processor is further configured to increment the first sharing counter and the second sharing counter independently therebetween in response to sharing actions associated with their associated first digital object and second digital object.

In some implementations of the server, to execute the spam preventive action, the processor is configured to execute at least one of: transmitting an indication of the digital object and the associated sharing actions to a human assessor; blocking the digital object for sharing; blocking the digital object for access; deleting the digital object; blocking at least one user account of one of the first user and the second user; sending a warning notification to one of the first user and the second user; sending a notification indicating a potential spam distribution to public users; sending a notification indicating a potential spam distribution to users invited to join a shared access to the digital object.

In some implementations of the server, the processor is further configured, prior to the executing a spam preventive action associated with the digital object, to execute a assessment routine to determine an individual sharing counter associated with the first user and an individual sharing counter associated with the second user.

In some implementations of the server, the sharing counter is associated with a time parameter.

In some implementations of the server, the time parameter is indicative of a time taken to reach the sharing counter value of the sharing counter.

In some implementations of the server, time parameter is indicative of an average incrementing speed of the sharing counter.

In some implementations of the server, the processor is further configured to assess the time parameter associated with the sharing counter dedicated to the digital object prior to executing a spam preventive action associated with the digital object.

In some implementations of the server, the processor is further configured to compare the time parameter to a time parameter threshold value when assessing the time parameter associated with the sharing counter.

In some implementations of the server, the processor is further configured to execute a spam preventive action associated with the digital object only responsive to the time parameter exceeding the time parameter threshold value.

In some implementations of the server, the processor is further configured to execute a spam preventive action associated with the digital object only responsive to the time parameter threshold value exceeding the time parameter

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
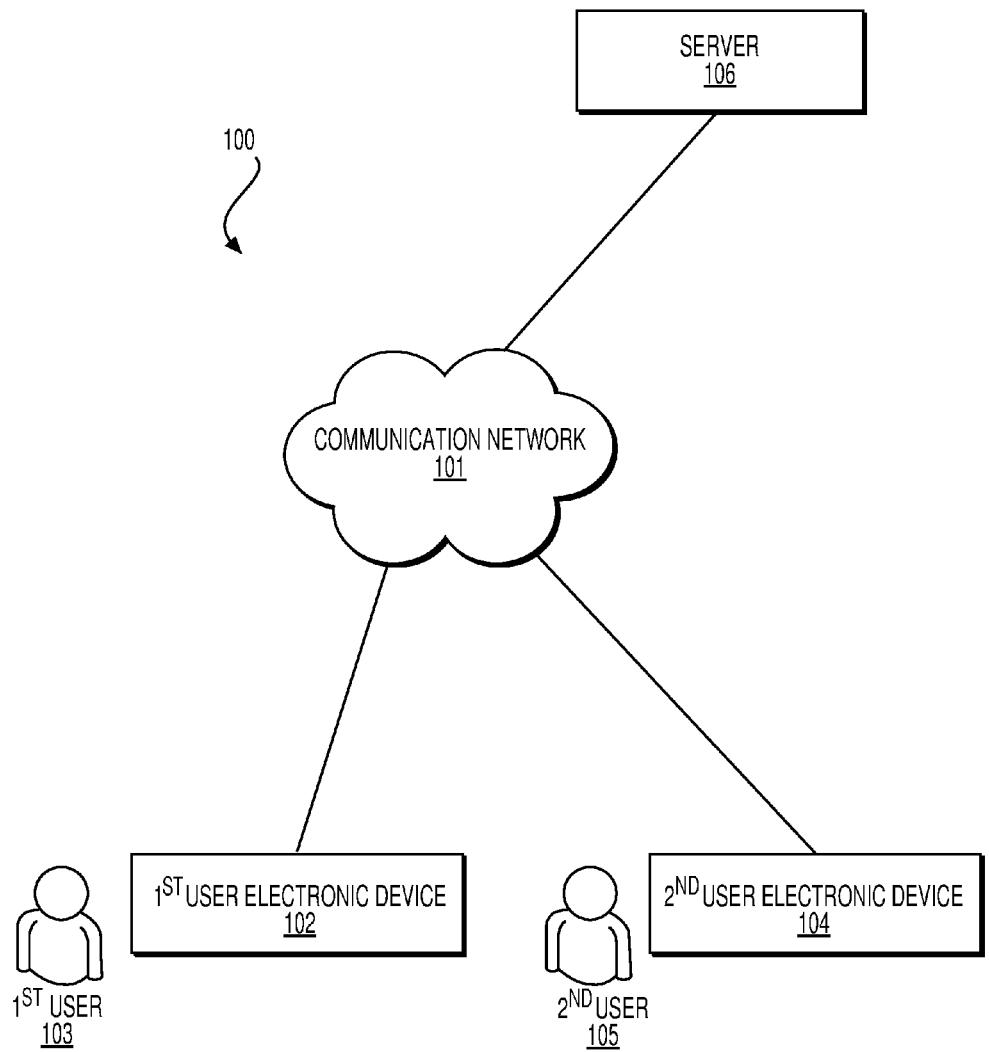
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The general arrangement of the system 100 is well known to those of skill in the art and, as such, only a high level description thereof will be presented here.

The system 100 comprises a communication network 101. The communication network 101 is typically associated with a plurality of user electronic devices associated respectively with a plurality of users. A first user electronic device 102 and a second user electronic device 104, respectively associated with a first user 103 and a second user 105, are indicated in FIG. 1 for illustrative purposes. It should be noted that the fact that the user electronic devices are associated with specific users does not need to suggest or imply any mode of operation—such as a need to log in, a need to be registered or the like. User electronic devices may include but are not limited to desktop computers, mobile devices (e.g., laptop computers, smartphones, mobile computing devices, or handheld), wearable electronic devices (smart watches) or other devices capable of transferring digital objects (e.g. files or folders) over network.

The communication network 101 is also associated with a server 106. The server 106 hosts a cloud storage service. The implementation of the server 106 is not particularly limited, but as an example, the server 106 may be implemented as a single server. Alternatively, the server 106 can be implemented as a plurality of servers. Within the latter embodiments, each of the plurality of servers implementing the server 106 may be responsible for storing digital objects from users in a particular region; or a particular type of users; or a particular type or size of digital objects. Alternatively, each of the plurality of servers implementing the server 106 may be configured to store digital objects according to a load-balancing approach executed by a supervisory entity (which can be one of the plurality of servers).

The server 106 can be implemented as a conventional computer server. In an example of an embodiment of the present technology, the server 106 is implemented as a Dell™ PowerEdge™ Server running the Microsoft™ Windows Server™ operating system. It should be understood that the server 106 can be implemented in any other suitable hardware and/or software and/or firmware or a combination thereof.

The server 106 is coupled to the first user electronic device 102 and the second user electronic device 104 associated respectively with the first user 103 and the second user 105 via the communication network 101. In some non-limiting embodiments of the present technology, the communication network 101 can be implemented as the Internet. In other embodiments of the present technology, the communication network 101 can be implemented differently, such as any wide-area communications network, local-area communications network, a private communications network and the like.

How the server 106 is coupled to the user electronic devices 102 and 104 via the communication network 101 is not particularly limited and will vary depending on how the communication network 101 and the respective user electronic devices 102 and 104 are implemented. Merely as an example and not as a limitation, in those embodiments of the present technology where the first user electronic device 102 is implemented as a wireless communication device (such as a smartphone or a tablet computer), the first user electronic device may be connected to the communication network via a wireless connection (such as but not limited to, a 3G communications network connection, a 4G communications network connection, a Wireless Fidelity, or WiFi® for short, a Bluetooth®, and the like). In those examples, where the first user electronic device 104 is implemented as a notebook computer, the first user electronic device 102 may be connected to the communication network 101 via either wireless (such as Wireless Fidelity, or WiFi® for short, Bluetooth® or the like) or wired (such as an Ethernet based) connection. The same is applicable to the second user electronic device 104. Different user electronic devices and different types of connection may be implemented independently of each other. It should be understood therefore that different user electronic devices can be implemented differently and that connection types will vary accordingly.

It should be expressly understood that implementations for user electronic devices 102 and 104, connection types and communication network 101 are provided for illustration purposes only. As such, those skilled in the art will easily appreciate other specific implementational details for these elements. As such, examples provided herein above are not meant to limit the scope of the present technology.

In one embodiment, the first user 103 and the second user 105 interact through the communication network 101 with the server 106 via the first user electronic device 102 and the second user electronic device 104. Interactions include, but are not limited to: uploading digital objects stored locally on user electronic devices 102 or 104 to the server 106, downloading digital objects stored locally on the server 106 to user electronic devices 102 or 104, modifying digital objects stored on the server 106, sharing digital objects or representations thereof stored on the server 106. The sharing includes but is not limited to: generating and sending a public link associated with the digital object to one or more public users; sending to one or more users an invitation to join a shared access to the digital object (to be described in greater detail herein below).

Figure 6:
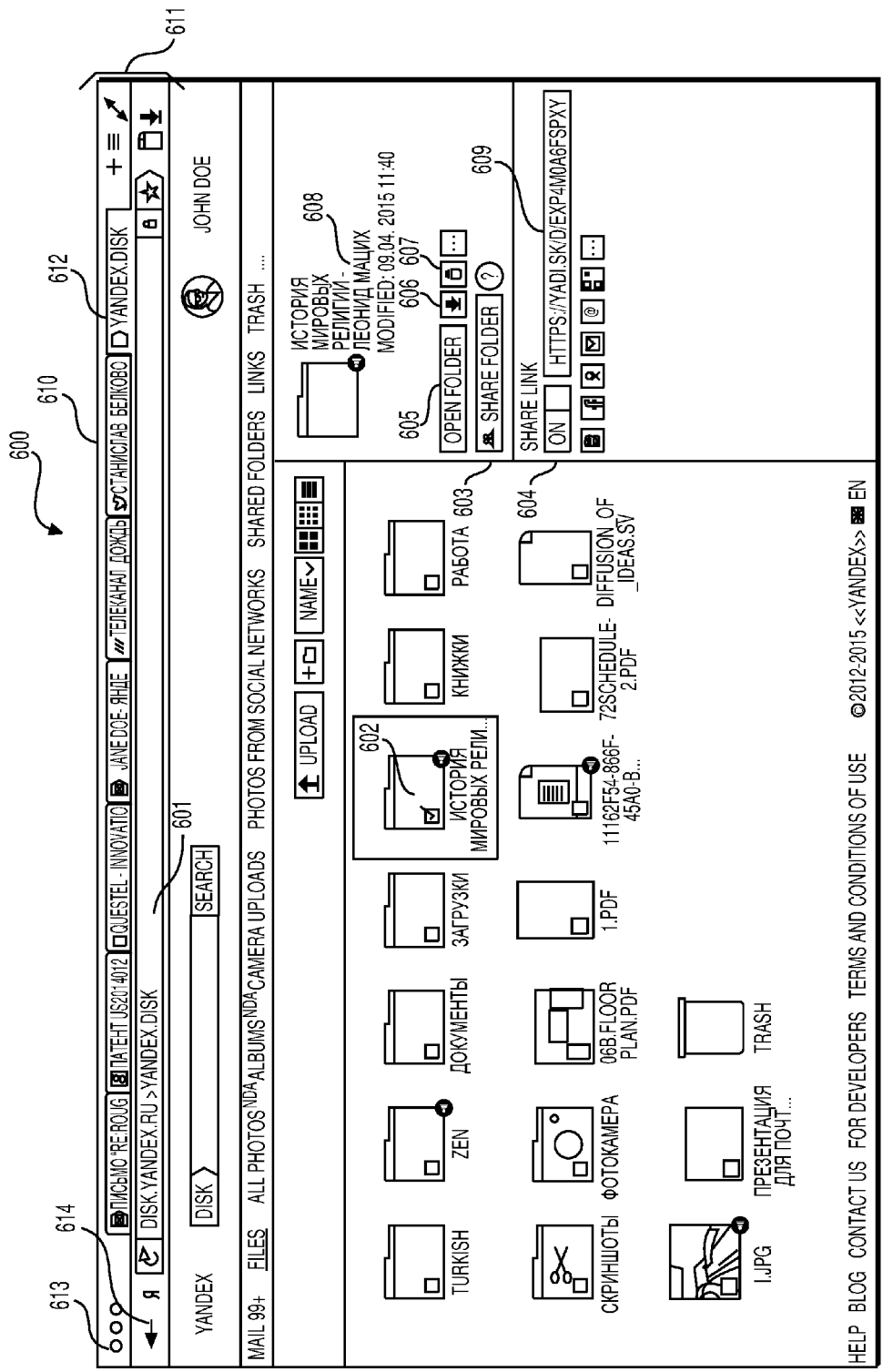
FIG. 6 depicts a screen shot, the screen shot illustrating an interface for sharing a folder in a cloud storage service, the interface being implemented in accordance with non-limiting embodiments of the present technology.

For further understanding and illustration of the system 100, reference is now made to FIG. 6, which depicts a screen shot 600 of a standard interface for uploading, modifying, downloading or sharing digital objects in a cloud storage service. It should be noted that FIG. 6 is for illustration purposes only to assist in understanding of the cloud storage service. It should also be understood that FIG. 6 contains a multitude of information, only relevant portions of which will be enumerated and described.

In the implementation illustrated in FIG. 6, the screen shot 600 depicts a user, for example the first user 103, accessing a cloud storage service with a browser application 610 executed on the first user electronic device 102. The browser application 610 has a command interface 611. The browser command interface comprises an address bar 601 to allow the user to type or copy-and-paste a Unified Resource Locator (URL) or, simply, an address associated with the web resource the user is looking for. The browser command interface further comprises various control buttons which include conventionally known buttons for navigating in the browser application 610 or in the internet, such as a well-known close button 613 for closing the browser application 610 and the well-known back button 614 for allowing the user to go back to one or more of the previously viewed web resources. The command interface 611 also contains a plurality of opened tabs associated with webpages opened by the first user 103, the plurality of opened tabs containing a currently active tab 612 associated with the opened webpage of the could storage service depicted on the screen shot 600.

The screen shot 600 shows a plurality of digital objects (files and folders). One digital object 602 of the plurality of digital objects is selected by the first user 103 of the cloud storage service. The selected digital object 602 is marked with a checkmark (not specifically numbered). In the depicted embodiment the selected digital object 602 is a folder containing one or more files. A preview 608 of the digital object 602 is shown on the screen shot 600. The preview 608 contains an image of a folder with an audio content mark (not specifically numbered), the audio content mark indicative of the digital object containing audio files. The preview 608 also contains bibliographic information for the digital object (not specifically numbered). In alternative embodiments, where the digital object 602 is a file, the preview 608 may comprise an image of a first page of the document stored in the file, an icon associated with a software application for managing the file, an image preview of the information stored in the file and the like.

There are also shown: a download button 606 for downloading the selected digital object 602 from the server 106 to a user device; an open button 605 for opening the digital object 602, a delete button 607 for deleting the digital object 602; a share button 603, for inviting other users for a shared access to the digital object 602; share link button 604 for generating a public link 609 and controlling the access to the digital object via the public link 609. The interface may further comprise other buttons (not depicted) such as: rename button for renaming the digital object 602, copy button for copying the digital object 602, move to folder button for moving the digital object 602 into a different folder and the like The share button 603 is for inviting other users for a shared access to the digital object 602. The access to digital object 602 may be shared by the first user 103 with two or more users of a cloud storage service and the digital object 602 may be added to the respective lists of digital objects in the accounts of the two or more users of the cloud storage service who share access to the digital object 602 with the first user 103. The first user 103, who initially shared access to the digital object 602 may selectively grant permissions for manipulations with digital object 602 allowed to the users sharing the access to the digital object 602 with the first user 103. Such permissions may allow the users sharing the access to the digital object 602 with the first user 103 to perform manipulations with the digital object 602 such as but not limited to: modifying the digital object 602, viewing the digital object 602, deleting the digital object 602, inviting other users for a shared access to the digital object 602 and the like.

Users who receive the invitation for a shared access to the digital object 602 may be referred to as "invited users". As has been mentioned above, invited users may have registered or subscribed to a cloud storage service, although in some cases they may be not.

When the first user 103 activates share button 603, the user may be offered to type in or choose from the suggested list one or more email addresses or logins or other credentials of one or more users whom the first user 103 is desirous to invite to join the shared access to the digital object 602. This can be executed, for example, in a separate pop-up window (not depicted). After the first user 103 has entered the credentials of the user to be invited to join the shared access to the digital object 602, the notification is sent to the invited user, the notification notifying the invited user about an invitation to join the shared access to the digital object 602.

The notification may be sent via e-mail to the e-mail address of the invited user entered by the first user 103. In some embodiments, if the invited user is registered in the cloud storage service the notification may be sent to the cloud storage service account associated with the invited user. In some embodiments, if the invited user is not registered in the cloud storage service the notification may be sent to the e-mail address of the invited user entered by the first user 103.

The notification may be configured to allow the invited user to accept or reject an invitation to join the shared access to the digital object 602. If the invited user is registered in the cloud storage service and accepts the invitation, the shared digital object 602 is then added to the list of digital objects in the cloud storage service account of the invited user. If the invited user is not registered in the cloud storage service and accepts the invitation, the invited user may be offered to register in the cloud storage service. After the invited user registers in the cloud storage service, the account of the invited user is created in the cloud storage service and the shared digital object 602 is then added to the list of digital objects in the cloud storage service account of the invited user.

In the embodiment illustrated in FIG. 6, the share link button 604 is for generating a public link 609. The public link 609 is generated in a public link field (not specifically numbered). The public link 609 allows other users (i.e., users other than the first user 103) to access, view, or download the digital object 602. Other users who receive the public link 609 or access the digital object 602 via the public link 609 may be referred to as "public users". In some cases, public users may have subscribed or registered with a cloud storage service, although typically a public user is not a registered user or subscriber to the cloud storage service.

The public link 609 may be sent by the first user 103 to public users via various means of communication which include but are not limited to: in an e-mail message, in an SMS message, in a message in an instant messaging application, in a social network message, in a social network publication, internet forum or any other website suitable for publishing content and the like. Public users may access the digital object 602 via the public link 609.

Implementation of the public link 609 is not particularly limited. In some implementations, the public link 609 is an internet address for the particular file to be loaded (typically an URL or Universal Resource Locator, such as www.webpage.com or http://yadi.sk/d/tSQaMY-IK89Ks). In some implementations, the public link 609 is a reference to data composed of a word, a group of words, a string of text, or an image, that a user can click on to access a document. Implementation of the public link 609 is not intended to be limited. It will be appreciated by a person of skill in the art that other implementations are possible, and any such implementation is intended to be included.

Referring again to FIG. 6, it should be noted that how the cloud storage service is accessed by the first user 103 is not particularly limited. As one example, as depicted in FIG. 6, the first user 103 may access a web site associated with the server 106. For example, the server 106 can be accessed by typing in an URL associated with Yandex™ search engine at www.yandex.ru. It should be expressly understood that server 106 may be accessed using any other commercially available or proprietary search engines. A browser application 418 may be used as depicted, i.e., a first user electronic device 102 may be executing the browser application 418, which can be implemented as a Yandex™ browser application. It should be expressly understood that any other commercially available or proprietary browser applications can be used for implementing non-limiting embodiments of the present technology. Further, any other suitable interface for accessing the server 106 can be used.

It should also be noted that other types of applications may be used to access the cloud storage service hosted on the server 106. In some embodiments, the first user 103 can access the cloud storage service using an application specifically dedicated for accessing the cloud storage service. The first user electronic device 102 may be executing the application. For example, the first user 103 can access the cloud storage service via Yandex™ Disk application executed on the first user electronic device 102. Other commercially available or proprietary applications dedicated for accessing cloud storage services may be used for implementing non-limiting embodiments of the present technology. In some embodiments, an application specifically dedicated for accessing a cloud storage service executed on the first user electronic device 102 integrates network-stored digital objects with the local file system of the user electronic device 102 to enable the first user 103 to manipulate network-stored files through the same user interface (UI) used to manipulate digital objects on the local file system, e.g., via a file explorer, file finder and the like. It should be noted that in the foregoing description of non-limiting embodiments of interfaces for accessing the cloud storage service, reference is made to the first user 103 and the first user electronic device 102 for illustrative purposes only, and it should be expressly understood that the same may equally apply to the second user 105 and user electronic device 104 and to other users of the cloud storage service and their respective user electronic device.

For further understanding and illustration of the system 100, reference will now be made to FIG. 2, which depicts a schematic illustration of a non-limiting embodiment of the server 106.

Figure 2:
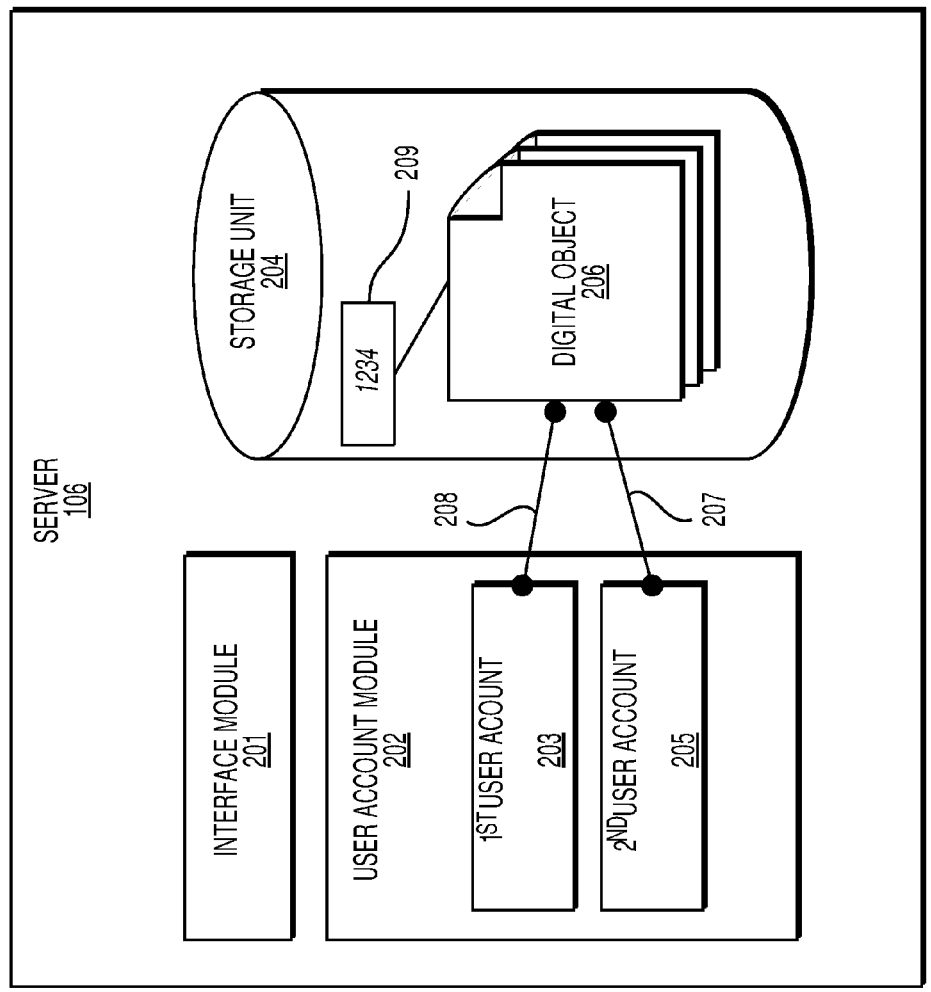
FIG. 2 is a schematic diagram depicting a server depicted in FIG. 1, the server being implemented in accordance with non-limiting embodiments of the present technology.

In the embodiment depicted in FIG. 2 the server 106 includes an interface module 201, a user account module 202, and a storage unit 204. In various embodiments, the server 106 may include one or more servers that are located in close physical proximity, or some servers may be locally together and others remote. It should be understood that the depicted functional structure of the server 106 should not be considered limiting to the scope of the present technology. In other embodiments, the functional structure of the server 106 may differ as to include functional modules and units not described in the depicted embodiment, exclude one or more functional modules and units described in the depicted embodiment or having different functionality of one or more modules and units described in the depicted embodiment.

Interface module 201 facilitates access to digital objects, storage of and transfer of digital objects between the server 106 and user electronic devices 102 and 104. Interface module 201 receives digital objects from and sends digital objects to user electronic devices 102 and 104. Interface module 201 may act as a counterpart to a user interface of an application specifically dedicated for accessing a cloud storage service that allows a user to manipulate digital objects stored on the server 106. As an alternative or an addition to a file explorer interface, interface module 201 may provide a web interface (e.g. similar to the one depicted in FIG. 6) for user electronic devices 102 and 104 to access (e.g. the via browser application 610) and allow the users 103 and 105 to manipulate digital objects stored on the server 106. In this way, the users 103 and 105 can directly manipulate digital objects stored on the server 106.

A user account module 202 is configured to maintain one or more accounts associated with one or more users, such as the first user account 203 and the second user account 205 respectively associated with the first user 103 and the second user 105. A user having an account in the cloud storage service hosted on the server 106 can be thought of as a registered user or a "subscriber" to the remote storage service provided by the server 106. Generally speaking, the term "subscriber" should not be interpreted to have any particular meaning and, as such, teachings of the present technology equally apply to both "free" and "paid for" cloud storage services.

The user account module 202 may track digital objects stored in the storage unit 204 (such as the digital object 206) and maintain association of digital objects with user accounts. As users 103 and 105 invite other users to join the shared access the digital object 206, the user account module 202 may update the list of digital objects associated with each user account in the storage unit 204. The user account module 202 may also track user electronic devices (such as user electronic devices 102 and 104) that are associated with each user account (e.g. a first user account 203 and the second user account 205). For example, the first user 103 may want to share all his or her digital objects between the first user electronic device 102 (e.g. a desktop computer) and a third user electronic device (not depicted) associated with the first user 103, which may be a mobile computing device (e.g., tablet computer, smart phone, etc.). To make such a sharing arrangement seamless to the first user 103, the first user single account 203 in the cloud storage service hosted on the server 106 may be associated with each of the first user electronic device 102 and the third user electronic device (not depicted) by creating a new digital object reference strings associated with digital objects to be shared for each of the first user electronic device 102 and the third user electronic device and storing the digital object reference strings in the list of digital objects associated with the first user 103 and the first user account 203. In this way, cloud storage service hosted on the server 106 may be able to determine which user electronic device is requesting retrieval of the file. Additionally, in some embodiments, the user account module 202 may facilitate synchronization between and among the various user electronic devices and the server 106. In some embodiments, an application executed on the first user electronic device 102 manages synchronization of the list of digital objects associated with the first user account stored on the first user electronic device 102 with the list of digital objects associated with the first user account 203 stored on the server 106 in order to maintain synchronized locally stored digital objects with the server stored digital objects.

The storage unit 204 is typically a unit capable of storing digital objects, such as the digital object 206. The digital object 206 can be a file or a folder containing at least one file or any other digital content item which can be stored on a computer and transmitted via communication networks. The digital object 206 stored in the storage unit 204 is shown for illustrative purposes. Like the server 106, the storage unit 204 may be implemented as a single unit, or alternatively as a plurality of units.

Typically, in a cloud storage service, in order to avoid unnecessary use of storage space of the storage unit 204, administrators of the server 106 try to avoid storing duplicate copies of the same digital object (e.g. a file). Accordingly, when a user (the first user 103 for example) uploads a digital object 206 to the server 106, the digital object 206 will undergo a deduplication process, in which the digital object 206 is checked to determine whether it is duplicative of another digital object which is already stored by the cloud storage service. If a digital object 206 is found to be duplicative, then rather than storing a second copy of the same digital object 206, the first user 103 uploading the duplicative copy will simply be associated via a first association link 208 with the first copy of the digital object 206 which is already stored on the server 106. In some embodiments, the first association link 208 may be implemented as an entry in a file-user map mapping user accounts to digital objects. Thus one physical copy (i.e. a single instance) of the digital object 206 may be linked to accounts of multiple users who uploaded their duplicative copy of the digital object. For example, one physical copy (i.e. a single instance) of the digital object 206 may be linked to the first user account 203 and the second user account 205. The first user 103 may be unaware of the fact that a digital object 206 uploaded by him or her is deduplicated and that the digital object 206 in his or hers cloud service account 203 is a previously uploaded copy of the digital object 206 uploaded by the second user 105. Deduplication systems are known in the art, such as that described in U.S. Patent Application Publication No. 2011/0225129. It is intended that any suitable deduplication system can be used in implementations of the present technology. In one specific embodiment of the present technology, the deduplication process uses a checksum algorithm.

Referring again to FIG. 2, there is depicted a digital object 206 stored in the storage unit 204. The digital object is associated with the first user account 203 via the first association link 208 and with the second user account 205 via a second association link 207.

The digital object 206 is further associated with a sharing counter 209. The sharing counter 209 is any suitable counter of total sharing actions associated with the digital object 206 across all of the user accounts of the cloud storage service such as the first user account 203 and the second user account 205 which are associated with a digital object 206 via respective association links, such as but not limited to: the number of times one or more public links associated with the digital object 206 were generated by the first user 103 and the second user 105; the number of times public users accessed the digital object 206 via a public link associated therewith, the number of times the first user 103 and the second user 105 invited other users to join the shared access to the digital object 206, the number of times invited users accepted the invitation to join shared access to the digital object 206 and the like.

In alternative embodiments the sharing counter 209 or the digital object 206 associated therewith may be further associated with a first individual sharing counter (not depicted) and a second individual sharing counter (not depicted) respectively associated with the first user 103 and the second user 105. The first and the second individual sharing counters may be indicative of the respective numbers of sharing actions associated respectively with the first user 103 and the second user 105 and the digital object 206.

In some embodiments of the method, the server 106 may execute assessment routine to determine values of the first individual sharing counter (not depicted) and the second individual sharing counter (not depicted) respectively associated with the first user 103 and the second user 105. It might be the case that information about sharing actions associated with particular user account may be useful for later analysis of spam attacks. For example, it may be analysed by the administrator or the operator associated with the server 106. Accordingly, during the assessment routine, the server 106 may store values of the first individual sharing counter (not depicted) and the second individual sharing counter (not depicted) respectively associated with the first user 103 and the second user 105. For example, the values may be stored in a log file associated with the server 106.

In some embodiments the sharing counter 209 or the digital object 206 associated therewith may be further associated with a time parameter (not depicted).

In some embodiments, the time parameter may be indicative of time taken for the sharing counter 209 to reach the current sharing counter value. For example, if the sharing counter value of the sharing counter 209 is 2 counts, and the time parameter value is 60 minutes it should be interpreted as the number of sharing actions associated with the digital object 206 incremented from 0 to 2 in 60 minutes. In some embodiments the time parameter may track time from the moment the digital object 206 was initially uploaded to or created on the server 106. In alternative embodiments the time parameter may be triggered by the first sharing action associated with the digital object 206 and may track time from the moment of first sharing action associated with the digital object occurring in the cloud storage service.

In some embodiments, the time parameter may be indicative of an average incrementing speed of the sharing counter. For example, if the sharing counter value of the sharing counter 209 is 2 counts, and the time parameter value is 1 count per hour it should be interpreted as that on average 1 sharing action associated with the digital object 206 occurs in the cloud storage service per one hour. It then may be derived that the time needed for the time parameter to increment value from 0 to 2 was one hour. In some embodiments the average incrementing speed of the sharing counter may be calculated for the time period staring from the moment digital object was initially uploaded to or created on the server 106. In alternative embodiments the average incrementing speed of the sharing counter may be calculated for the time period staring from the moment the first sharing action associated with the digital object 206 and occurred in the cloud storage service.

The implementation of the time parameter is not particularly limited, and it should be expressly understood that the time parameter may be implemented using units of time or units of average incrementing speed other than those described in the exemplary embodiments above. It should also be noted that other events may trigger tracking of time or average sharing speed performed by the time parameter.

Figure 3:
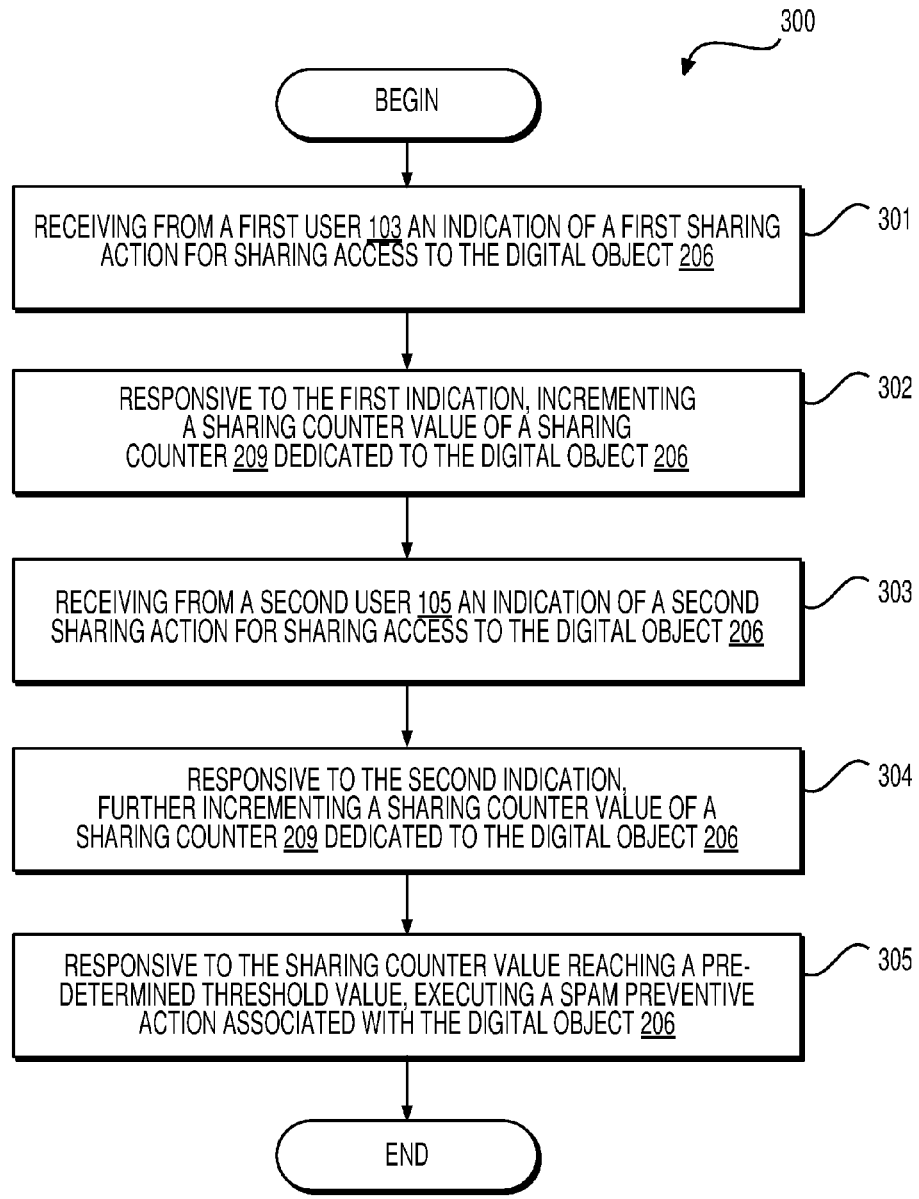
FIG. 3 is a block diagram depicting a method, the method being implemented within the system of FIG. 1 and being implemented according with non-limiting embodiments of the present technology.

Reference will now be made to FIG. 3, which depicts a method 300, the method 300 being implemented within the system 100 of FIG. 1 and being implemented according with non-limiting embodiments of the present technology. The method 300 can be conveniently executed at the server 106.

Step 301—Receiving from a First User 103 an Indication of a First Sharing Action for Sharing Access to the Digital Object 206

The method 300 begins at step 301, where the server 106 receives via the communication network 101 from the first user electronic device 102 associated with the first user 103 an indication of a first sharing action associated with a digital object 206 stored on the server 106. In some embodiments the first indication may be indicative of the first user 103 generating a public link associated with the digital object 206. In some embodiments the first indication may be indicative of the first user 103 sending a public link associated with the digital object 206 to one or more public users. In alternative embodiments, the first indication may be indicative of the first user 103 of the cloud storage system inviting other users to join the shared access to the digital object 206.

In some embodiments, the digital object 206 may be associated with the first user account 203 of the first user 103 via the first association link 208. In some embodiments the digital object 206 may be previously uploaded to the server 106 by the first user 103 or the second user 105.

In embodiments of the present technology, both the first user 103 and the second user 105 have access to the digital object 206 via the communication network 101.

In some non-limiting embodiments of the present technology, the digital object 206 stored on the server 106 is a single instance of the digital object 206 associated with the first user account 203 and the second user account 205 via respective association links 208 and 207. One or both of the association links 208 and 207 may be established by the server 106 during a deduplication process, as has been explained above. The first version of the digital object 206 may be uploaded to the server 106 by the first user 103 and the second version of digital object 206 may be uploaded to the server 106 by the second user 105. The server 106 may conduct a deduplication process and upon detection that that the first version of the digital object 206 and second version of digital object 206 are the same, the server 106 may discard a selected one of the first version of the digital object 206 and the second version of digital object 206. The selected version may be the later received version of the digital object 206. The server may then establish an association link between the stored single instance of the digital object 206 and the selected one of or both of the first user account 203 and the second user account 205.

Step 302—Responsive to the First Indication, Incrementing a Sharing Counter Value of a Sharing Counter 209 Dedicated to the Digital Object 206

When the server 106 receives the first indication of the sharing action associated with a digital object 206, it triggers incrementing of the sharing counter value of the sharing counter 209 associated with a digital object 206.

The way the sharing counter value is incremented is not particularly limited. In some embodiments the sharing counter value may count sharing actions associated with the digital object 206, i.e. each sharing action will increase the value of a sharing counter 209 by 1. In alternative embodiments, sharing actions of different types may increment the value of the sharing counter 209 in different increments. For example, generating a public link associated with the digital object 206 may increment the value of the sharing counter 209 by 1, whereas invitation for a shared access for the digital object 206 may increment the value of the sharing counter 209 by 2. The increments of the sharing counter 209 may be same for sharing actions of each type or may be determined independently by the administrator of the server 106. In some embodiments, sharing counter value increments per sharing action may be different for different types of digital object 206. For example generating a public link associated with a digital object 206 which is an image file may increment the sharing counter 209 associated with the image file by 1, whereas the same generating a public link associated with a digital object 206 which is a software application may increment the sharing counter 209 by 2. In various embodiments the values of increments per sharing action may vary, and any suitable sharing counter increment per sharing action is intended to be included.

In some embodiments, the sharing counter 209 can be additionally configured to increment its value responsive to sharing actions associated with the digital object 206 performed by public users or invited users. In some embodiments, the sharing counter can additionally be incremented responsive to a public user accessing the digital object 206 via a public link associated therewith. In some non-limiting embodiments, the sharing counter 209 can additionally be incremented responsive to an invited user accepting the invitation to have shared access to the digital object 206.

In some embodiments, if the server has a plurality of digital objects stored thereon, the sharing counter values of each digital object from the plurality of digital objects may be incremented independently from sharing counters of other digital objects from the plurality of digital objects.

Step 303—Receiving from a Second User 105 an Indication of a Second Sharing Action for Sharing Access to the Digital Object 206

At step 303 the server 106 receives via a communication network 101 from the second user electronic device 104 associated with the second user 105 an indication of a second sharing action associated with the digital object 206 stored on the server 106. In some embodiments the second indication may be indicative of the second user 105 generating a public link associated with the digital object 206. In some embodiments the second indication may be indicative of the second user 105 sending a public link associated with the digital object 206 to one or more public users. In some implementations of the technology, the first user 103 and the second user 105 send the same public link to public users. However, it should be expressly understood that in other implementations, the first user 103 and the second user 105 may generate and send different public links to public users. In other words, public links generated and sent by the first user 103 and the second user 105 need not be the same, although they might be. In some embodiments, the second indication may be indicative of the second user 105 inviting other users to join the shared access to the digital object 206. It should also be noted that the first sharing action and the second sharing action need not necessarily be of the same kind, although they may be. For example, the first sharing action can be generating a public link associated with the digital object 206 whereas the second action can be inviting other users to join the shared access to the digital object 206.

In some embodiments, the digital object 206 is associated with the second user account 205 of the second user 105 via the second association link 207.

Step 304—Responsive to the Second Indication Further Incrementing the Sharing Counter Value of a Sharing Counter 209 Dedicated to the Digital Object 206

When the server 106 receives the first indication of the sharing action associated with a digital object 206, it triggers further incrementing of the sharing counter value of the sharing counter 209 associated with a digital object 206.

Step 305—Responsive to the Sharing Counter Value Reaching a Pre-Determined Threshold Value, Executing a Spam Preventive Action Associated with the Digital Object 206

In step 305 of the method 300, a spam preventive action is applied to the digital object 206, if the sharing counter value of the sharing counter 209 is above a pre-determined sharing counter threshold.

In implementations of the technology, a spam preventive action is not particularly limited. The term "spam preventive action" is intended to include any action which is aimed at preventing or blocking spam attacks and mass distribution of harmful software and other unwanted digital content items. In some embodiments spam preventive action may include: transmitting an indication of the digital object 206 and the sharing actions associated therewith to a human assessor; blocking the digital object 206 for sharing (i.e. inviting other users to join shared access to the digital object 206); blocking generation of public links associated with the digital object 206; blocking the digital object 206 for access; deleting the digital object 206 from the server 106; deleting copies of the digital object 206 stored locally on user electronic devices 102 and 104 associated with the digital object 206; preventing copies of the digital object 206 being uploaded to the server 106; blocking at least one user account of one of the first user 103 and the second user 105; sending a warning notification to one of the first user 103 and the second user 105; sending a notification indicating a potential spam distribution to public users; sending a notification indicating a potential spam distribution to users invited to join the shared access to the digital object 206. A combination of any of the foregoing may also be used. Many spam preventive actions for preventing or blocking spam attacks and mass distribution of harmful software are known, and any of such suitable spam preventive actions are intended to be included.

In some implementations, a spam preventive action is executed at the server 106.

In some implementations, applying a spam preventive action includes generating a trigger by the server 106 and sending, by the server 106, the trigger via the communication network 101 to the user electronic devices 102 and 104; and the trigger causing the user electronic devices 102 and 104 to apply the spam preventive action associated with at least one of: deleting copies of the digital object 206 stored locally on user electronic devices 102 and 104; displaying a warning notification to the first user 103 and the second user 105; blocking generation of public links associated with the digital object 206; blocking the digital object 206 for sharing and the like.

A pre-determined threshold value used for the sharing counter value is not particularly limited. In some embodiments an administrator or operator associated with the server 106 may set the pre-determined threshold based on an empirical review of spam distribution activities and patterns. Alternatively, an administrator or operator of the server 106 may set the pre-determined threshold at a certain level and then amend the pre-determined threshold from time to time, based for example, on user feedback on spam preventive-actions being mistakenly applied to non-spam digital objects.

In some embodiments, the pre-determined threshold may be the same for all digital objects stored on the server 106. In other embodiments, as some types of digital objects are more likely to be spam then others, different thresholds may be set up for different types of digital objects. For example, if the digital object 206 is an image file, the threshold applied thereto may be set up to be 100 sharing actions associated with the digital object 206, whereas if the digital object 206 is a Microsoft Excel spreadsheet file, the threshold applied thereto may be set up to be 10000 sharing actions associated with the digital object 206. In some embodiments, lower thresholds may be applied to digital objects containing spam-marker words or phrases in the title or content of the digital object. For example, if the digital object 206 contains spam-marker phrase "best offer", the threshold applied thereto may be 50 sharing actions associated with the digital object 206, whereas if the digital object 206 does not contain any spam-marker words or phrases, the threshold applied thereto may be 100 sharing actions associated with the digital object 206. In some non-limiting examples of the present technology, the selection of threshold to be applied to the digital object 206 may be based at least in part on metadata associated with the digital object 206 such as information about when the digital object 206 was created, who created it, when it was last updated, file size of the digital object 206 and the like. A combination of any of the foregoing is also included. It is intended that any suitable pre-determined threshold may be set.

Figure 4:
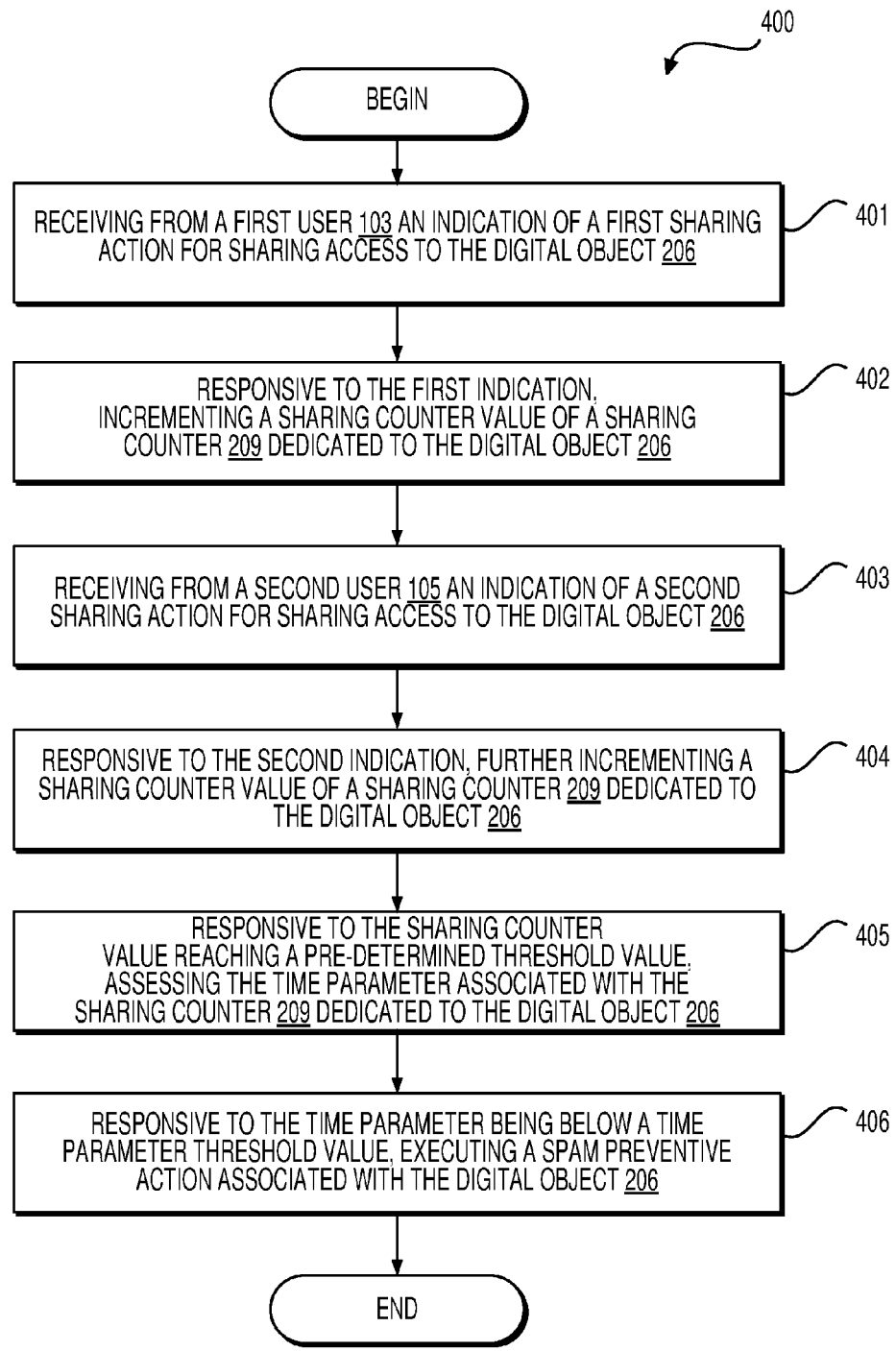
FIG. 4 is a block diagram depicting a method, the method being implemented within the system of FIG. 1, the method being implemented in accordance with another non-limiting embodiment of the present technology.

Reference will now be made to FIG. 4, which depicts a method 400, the method 400 being implemented within the system 100 of FIG. 1 and being implemented according with non-limiting embodiments of the present technology. The method 400 can be conveniently executed at the server 106.

Steps 401, 402, 403, 404 are respectively similar to steps 301, 302, 303, 304 of the method 300 as described above. In the non-limiting embodiment of method 400 depicted in FIG. 4 the sharing counter 209 is associated with a time parameter which is indicative of time taken for the sharing counter 209 to reach the current sharing counter value. In should be noted, that in alternative embodiments of method the time parameter may be indicative of the average incrementing speed of the sharing counter 209. The method 400 in this case will be changed accordingly, which will be described in greater detail herein below.

Step 405—Responsive to the Sharing Counter Value Reaching a Pre-Determined Threshold Value, Assessing the Time Parameter Associated with the Sharing Counter 209 Dedicated to the Digital Object 206

In step 405 of the method 400 the server 106 assesses the time parameter, if the sharing counter value reached a pre-determined threshold.

Step 406—Responsive to the Time Parameter being Below a Time Parameter Threshold Value, Executing a Spam Preventive Action Associated with the Digital Object 206

In step 406 of the method 400, a spam preventive action is applied to the digital object 206, if the time parameter associated with the sharing counter 209 is below a time parameter threshold value.

How the time parameter threshold is implemented is not particularly limited. In some embodiments an administrator or an operator associated with the server 106 may set the time-parameter threshold based on an empirical review of spam distribution activities and patterns. Alternatively, an administrator or operator of the server 106 may set the pre-determined threshold at a certain level and then amend the time parameter threshold from time to time, based for example, on user feedback on spam preventive-actions being mistakenly applied to non-spam digital objects.

In some embodiments the time parameter threshold may be the same for all digital objects stored on the server 106.

In other embodiments the selection of the time parameter threshold may be based at least in part on the type of the digital object 206. In other non-limiting embodiments the time parameter threshold may be determined based on metadata associated with the digital object 206. In some alternative embodiments the time parameter threshold associated with the sharing counter 209 may be determined based on the sharing counter value threshold. It is intended that any suitable time-parameter threshold may be set.

Figure 5:
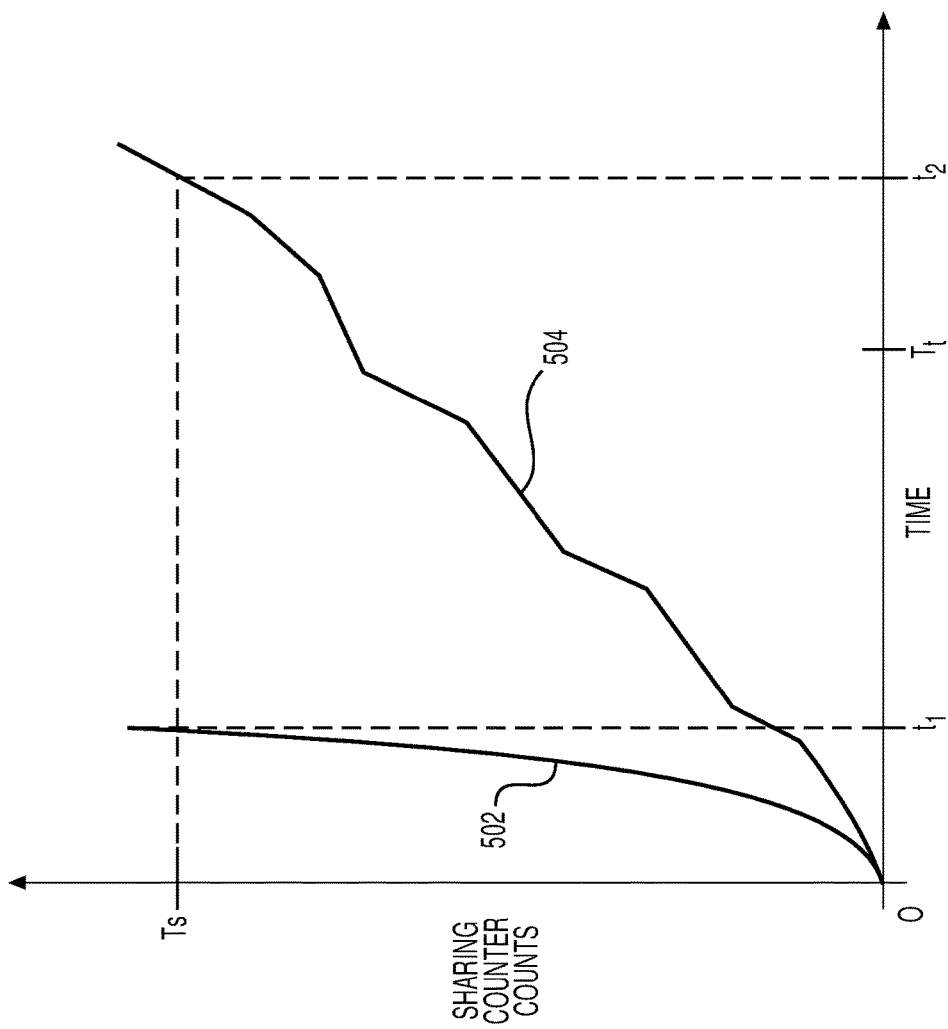
FIG. 5 depicts a diagram having two example graphs showing changes over time of counts of a sharing counter.

For a better understanding of step 406 of the method 400 reference is now made to FIG. 5, which depicts two graphs, 502 and 504, which respectively reflect the first and the second example of changes over time of the counts (i.e. value) of the sharing counter 209 associated with the digital object 206.

On the diagram in FIG. 5, $T_S$ denotes the pre-determined sharing counter threshold of the sharing counter 209 associated with the digital object 206; $T_t$ denotes the time parameter threshold for the time parameter associated with the sharing counter 209.

In the first example, the steep graph 502 shows rapid growth of the sharing counter value, wherein the value of the sharing counter 209 reaches threshold $T_S$ when the value of the time parameter associated with the sharing counter 209 is $t_1$.

In the second example, the mildly sloping graph 504 shows slow growth of the sharing counter value, wherein the value of the sharing counter 209 reaches threshold $T_S$ when the value of the time parameter associated with the sharing counter 209 is $t_2$.

In the first example, rapid growth of the sharing counter value may be indicative of spamming activity associated with the digital object 206, as in this case the value of the time parameter $t_1$ at the moment of the sharing counter 209 reaching the threshold $T_S$ is lower than the time parameter threshold $T_t$. Accordingly, a spam preventive action will be applied to the digital object 206 by the server 106 in step 406 of the method 400 responsive to the time parameter value $t_1$ being below threshold.

In the second example, although the sharing counter value of the sharing counter 209 reached the threshold $T_S$, the time taken for that is much longer than in the first example, which may be indicative of normal sharing activity associated with digital object 206. The time parameter value $t_2$ at the moment of the sharing counter 209 reaching the threshold $T_S$ is lower than the time parameter threshold $T_t$. Accordingly, a spam preventive action will not be applied to the digital object 206 by the server 106 in step 406 of the method 400 responsive to the time parameter value $t_1$ being below threshold.

Referring again to the method 400 depicted in FIG. 4, it should be noted that in some non-limiting embodiments of the method 400 alternative to the embodiment shown in FIG. 4, the time parameter associated with the sharing counter 209 may be indicative of the average incrementing speed of the sharing counter 209 and, as the average incrementing speed of the sharing counter is reciprocal to the time taken to reach the sharing counter value, in those alternative embodiments the step 406 of the method 400 should be modified to execute time spam preventive action responsive to the time parameter being above a time parameter threshold value. The time parameter threshold value should be modified accordingly to denote maximum average incrementing speed of the sharing counter 209.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

In should also be noted, that although the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A method of detecting spam activity in a cloud service, the cloud service hosted on a server (106), the server (106) having a digital object (206) stored thereon, the server (106) being accessible, via a communication network (101), by a plurality of users of the cloud service, the method executable by the server (106), the method comprising:
  receiving from a first user (103) of the plurality of users of the cloud storage service an indication of a first sharing action for sharing access to the digital object (206);
  responsive to the first indication, incrementing a sharing counter value of a sharing counter (209) dedicated to the digital object (206);
  receiving from a second user (105) of the plurality of users of the cloud storage service an indication of a second sharing action for sharing access to the digital object (206);
  responsive to the second indication further incrementing the sharing counter value of a sharing counter (209) dedicated to the digital object (206);
  responsive to the sharing counter value reaching a pre-determined threshold value, executing a spam preventive action associated with the digital object (206).

[Clause 2] The method of clause 1, wherein each one of the first user (103) and the second user (105) is respectively associated with a first user account (203) and a second user account (205) in a cloud service.

[Clause 3] The method of any one of clauses 1 and 2, wherein the digital object (206) is one of:
   a file,
   a folder containing at least one file.

[Clause 4] The method of any one of clauses 1 to 3, wherein the digital object (206) has been previously uploaded to the server (106) by at least one of the first user (103) and the second user (105).

[Clause 5] The method of any one of clauses 1 to 4, wherein both the first user (103) and the second user (105) have access to the digital object (206).

[Clause 6] The method of any one of clauses 1 to 5, wherein the sharing action includes at least one of:
   generating a public link associated with the digital object (206);
   sending a public link associated with the digital object (206) to one or more public users;
   sending to one or more invited users an invitation to join a shared access to the digital object (206).

[Clause 7] The method of any one of clauses 1 to 6, wherein the sharing counter (209) is additionally configured to be incremented responsive to at least one of:
   an invited user accepting an invitation to join the shared access to the digital object (206)
   a public user accessing the digital object (206) through the public link associated with the digital object (206).

[Clause 8] The method of any one of clauses 1 to 7, wherein prior to the receiving from the first user (103) of the plurality of users of the cloud service the indication of the first sharing action, the method further comprises:
   receiving from a first upload action for a first version of the digital object (206);
   receiving from the second user (105) a second upload action for a second version of the digital object (206);
   executing a de-duplication process to store a single instance of the digital object (206), the single instance accessible to both the first user (103) and the second user (105).

[Clause 9] The method of clause 8, further comprising storing only the single instance of the digital object (206) on the server (106).

[Clause 10] The method of any one of clauses 8 to 9, wherein executing the de-duplication process comprises:
   responsive to determining that the first version of the digital object (206) and the second version of the digital object (206) are the same, discarding a selected one of the first version of the digital object (206) and the second version of the digital object (206), the selected one being a later received version of the digital object (206).

[Clause 11] The method of any one of clauses 8 to 10, wherein each of a first user account (203) associated with the first user (103) and a second user account (205) associated with the second user (105) are assigned a link pointing to the single instance of the digital object (206).

[Clause 12] The method of any one of clauses 1 to 11, wherein the digital object (206) is a first digital object (206), wherein the sharing counter (209) is a first sharing counter, and wherein:
   the server (106) has a second digital object (206) stored therein, the second digital object (206) having a second sharing counter associated therewith, and wherein
   the first sharing counter (209) and the second sharing counter are incremented independently therebetween in response to sharing actions associated with their associated first digital object (206) and second digital object (206).

[Clause 13] The method of any one of clauses 1 to 12, wherein the spam preventive action comprises at least one of:
   transmitting an indication of the digital object (206) and the associated sharing actions to a human assessor;
   blocking the digital object (206) for sharing;
   blocking the digital object (206) for access;
   deleting the digital object (206);
   blocking at least one user account of one of the first user (103) and the second user (105);
   sending a warning notification to one of the first user (103) and the second user (105);
   sending a notification indicating a potential spam distribution to public users;
   sending a notification indicating a potential spam distribution to users invited to join a shared access to the digital object (206).

[Clause 14] The method of any one of clauses 1 to 13, further comprising, prior to the executing a spam preventive action associated with the digital object (206), executing a assessment routine to determine an individual sharing counter associated with the first user (103) and an individual sharing counter associated with the second user (105).

[Clause 15] The method of any one of clauses 1 to 14, wherein the sharing counter (209) dedicated to the digital object (206) is associated with a time parameter.

[Clause 16] The method of clause 15, wherein the time parameter is indicative of a time taken to reach the sharing counter value of the sharing counter (209).

[Clause 17] The method of clause 15, wherein the time parameter is indicative of an average incrementing speed of the sharing counter (209).

[Clause 18] The method of any one of clauses 15 to 17, further comprising, prior to the executing a spam preventive action associated with the digital object (206), assessing the time parameter associated with the sharing counter (209) dedicated to the digital object (206).

[Clause 19] The method of clause 18, wherein assessing the time parameter associated with the sharing counter (209) comprises comparing the time parameter to a time parameter threshold value.

[Clause 20] The method of clause 19, further comprising executing a spam preventive action associated with the digital object (206) only responsive to the time parameter exceeding the time parameter threshold value.

[Clause 21] The method of clause 19, further comprising executing a spam preventive action associated with the digital object (206) only responsive to the time parameter threshold value exceeding the time parameter.

[Clause 22] The method of any one of clauses 1 to 21, wherein the cloud service is a cloud storage service

[Clause 23] A server (106) configured to detect spam activity in a cloud service, the server (106) comprising:
   a communication interface for communication with an electronic device via a communication network, the electronic device being associated with one of a plurality of users of a cloud service provided by the server (106);
   an interface module (201);
   a user account module (202);
   a storage unit (204);
   a processor operationally connected with the communication interface, the user interface module (201), the user account module (202) and the storage unit (204), the processor configured to cause the memory module to store a digital object (206), the processor being further configured to:
receive from a first user (103) of the plurality of users of the cloud service an indication of a first sharing action for sharing access to the digital object (206);
responsive to the first indication, increment a sharing counter value of a sharing counter (209) dedicated to the digital object (206);
receive from a second user (105) of the plurality of users of the cloud service an indication of a second sharing action for sharing access to the digital object (206);
responsive to the second indication further increment the sharing counter value of the sharing counter (209) dedicated to the digital object (206);
responsive to the sharing counter value reaching a predetermined threshold value, execute a spam preventive action associated with the digital object (206).

[Clause 24] The server (106) of clause 23, the processor being further configured to associate each one of the first user (103) and the second user (105) respectively with a first user account (203) and a second user account (205) in a cloud service.

[Clause 25] The server (106) of any one of clauses 23 and 24, wherein the digital object (206) is one of:
a file,
a folder containing at least one file.

[Clause 26] The server (106) of any one of clauses 23 to 25, wherein the digital object (206) has been previously uploaded to the server (106) by at least one of the first user (103) and the second user (105).

[Clause 27] The server (106) of any one of clauses 23 to 26, the processor being further configured to provide both the first user (103) and the second user (105) with access to the digital object (206).

[Clause 28] The server (106) of any one of clauses 23 to 27, wherein the sharing action includes at least one of:
generating a public link associated with the digital object (206);
sending a public link associated with the digital object (206) to one or more public users;
sending to one or more invited users an invitation to join a shared access to the digital object (206);

[Clause 29] The server (106) of any one of clauses 23 to 28, wherein the sharing counter (209) is additionally configured to be incremented responsive to at least one of:
an invited user accepting an invitation to join the shared access to the digital object (206)
a public user accessing the digital object (206) through the public link associated with the digital object (206).

[Clause 30] The server (106) of any one of clauses 23 to 29, the processor being further configured to, prior to the receiving from the first user (103) of the plurality of users of the cloud service the indication of the first sharing action:
receive from the first user (103) a first upload action for a first version of the digital object (206);
receive from the second user (105) a second upload action for a second version of the digital object (206);
execute a de-duplication process to store a single instance of the digital object (206), the single instance accessible to both the first user (103) and the second user (105).

[Clause 31] The server (106) of clauses 30, the processor being further configured to store only the single instance of the digital object (206) on the server (106).

[Clause 32] The server (106) of any one of clauses 30 and 31, the processor being further configured to execute the de-duplication process such that:
responsive to determining that the first version of the digital object (206) and the second version of the digital object (206) are the same, discard a selected one of the first version of the digital object (206) and the second version of the digital object (206), the selected one being a later received version of the digital object (206).

[Clause 33] The server (106) of any one of clauses 30 to 32, the processor being further configured to assign a link pointing to the single instance of the digital object (206) to each of a first user account (203) associated with the first user (103) and a second user account (205) associated with the second user (105).

[Clause 34] The server (106) of any one of clauses 23 to 33, wherein the digital object (206) is a first digital object (206), wherein the sharing counter (209) is a first sharing counter, and wherein the processor is further configured to store a second digital object (206), the second digital object (206) having a second sharing counter associated therewith, and wherein the processor is further configured:
to increment the first sharing counter (209) and the second sharing counter independently therebetween in response to sharing actions associated with their associated first digital object (206) and second digital object (206).

[Clause 35] The server (106) of any one of clauses 23 to 34, wherein to execute the spam preventive action, the processor is configured to execute at least one of:
transmitting an indication of the digital object (206) and the associated sharing actions to a human assessor;
blocking the digital object (206) for sharing;
blocking the digital object (206) for access;
deleting the digital object (206);
blocking at least one user account of one of the first user (103) and the second user (105);
sending a warning notification to one of the first user (103) and the second user (105);
sending a notification indicating a potential spam distribution to public users,
sending a notification indicating a potential spam distribution to users invited to join a shared access to the digital object (206).

[Clause 36] The server (106) of any one of clauses 23 to 35, the processor being further configured, prior to the executing a spam preventive action associated with the digital object (206), to execute a assessment routine to determine an individual sharing counter associated with the first user (103) and an individual sharing counter associated with the second user (105).

[Clause 37] The server (106) of any one of clauses 23 to 36, wherein the sharing counter (209) is associated with a time parameter.

[Clause 38] The server (106) of clause 37, wherein the time parameter is indicative of a time taken to reach the sharing counter value of the sharing counter (209).

[Clause 39] The server (106) of clause 37, wherein the time parameter is indicative of an average incrementing speed of the sharing counter (209).

[Clause 40] The server (106) of clause 37, the processor being further configured to assess the time parameter associated with the sharing counter (209) dedicated to the digital object (206) prior to executing a spam preventive action associated with the digital object (206).

[Clause 41] The server (106) of clause 40, the processor being further configured to compare the time parameter to a time parameter threshold value when assessing the time parameter associated with the sharing counter (209).

[Clause 42] The server (106) of clause 41, the processor being further configured to execute a spam preventive action associated with the digital object (206) only responsive to the time parameter exceeding the time parameter threshold value.

[Clause 43] The server (106) of clause 41, the processor being further configured to execute a spam preventive action associated with the digital object (206) only responsive to the time parameter threshold value exceeding the time parameter.

The invention claimed is:

1. A method of detecting spam activity in a cloud service, the cloud service hosted on a server, the server having a first digital object and a second digital object stored thereon, the server being accessible, via a communication network, by a plurality of users of the cloud service, the method executable by the server, the method comprising:
  receiving from a first user of the plurality of users of the cloud storage service an indication of a first sharing action for sharing access to the first digital object;
  responsive to the first indication, incrementing a first sharing counter value of a first sharing counter dedicated to the first digital object, the first sharing counter being indicative of total sharing actions associated with the first digital object across all of the user accounts of the cloud storage service;
  receiving from a second user of the plurality of users of the cloud storage service an indication of a second sharing action for sharing access to the first digital object;
  responsive to the second indication further incrementing the first sharing counter value of a first sharing counter dedicated to the first digital object;
  responsive to the first sharing counter value reaching a pre-determined threshold value, executing a spam preventive action associated with the first digital object;
  the second digital object having a second sharing counter associated therewith, the second sharing counter being indicative of total sharing actions associated with the second digital object across all of the user accounts of the cloud storage service; and
  the first sharing counter and the second sharing counter being incremented independently therebetween in response to sharing actions associated with their associated first digital object and second digital object.

2. The method of claim 1, wherein each one of the first user and the second user is respectively associated with a first user account and a second user account in a cloud service.

3. The method of claim 1, wherein at least one of the first digital object and the second digital object is one of:
  a file, and
  a folder containing at least one file.

4. The method of claim 1, wherein the first digital object has been previously uploaded to the server by at least one of the first user and the second user.

5. The method of claim 1, wherein both the first user and the second user have access to the first digital object.

6. The method of claim 1, wherein the sharing action includes at least one of:
  generating a public link associated with one of the first digital object and the second digital object;
  sending a public link associated with one of the first digital object and the second digital object to one or more public users; and
  sending to one or more invited users an invitation to join a shared access to one of the first digital object and the second digital object.

7. The method of claim 6, wherein the at least one of the first sharing counter and the second sharing counter is additionally configured to be incremented responsive to at least one of:
  an invited user accepting an invitation to join the shared access to the respective one of the first digital object and the second digital object, and
  a public user accessing the digital object through the public link associated with the respective one of the first digital object and the second digital object.

8. The method of claim 1, wherein prior to the receiving from the first user of the plurality of users of the cloud service the indication of the first sharing action, the method further comprises:
  receiving from the first user a first upload action for a first version of the first digital object;
  receiving from the second user a second upload action for a second version of the first digital object; and
  executing a de-duplication process to store a single instance of the first digital object, the single instance accessible to both the first user and the second user.

9. The method of claim 8 further comprising storing only the single instance of the first digital object on the server.

10. The method of claim 8, wherein executing the de-duplication process comprises:
  responsive to determining that the first version of the first digital object and the second version of the first digital object are the same, discarding a selected one of the first version of the first digital object and the second version of the first digital object, the selected one being a later received version of the first digital object.

11. The method of claim 8, wherein each of a first user account associated with the first user and a second user account associated with the second user are assigned a link pointing to the single instance of the first digital object.

12. The method of claim 1, wherein the spam preventive action comprises at least one of:
  transmitting an indication of the first digital object and the associated sharing actions to a human assessor;
  blocking the first digital object for sharing;
  blocking the first digital object for access;
  deleting the first digital object;
  blocking at least one user account of one of the first user and the second user;
  sending a warning notification to one of the first user and the second user;
  sending a notification indicating a potential spam distribution to public users; and
  sending a notification indicating a potential spam distribution to users invited to join a shared access to the first digital object.

13. The method of claim 1, wherein at least one of the first sharing counter and the second sharing counter dedicated to respective one of the first digital object and the second digital object is associated with a respective one of a first time parameter and a second time parameter.

14. The method of claim 13, wherein at least one of the first time parameter and the second time parameter is indicative of a time taken to reach the respective one of the first sharing counter value of the first sharing counter and a second sharing counter value of the second sharing counter.

15. The method of claim 13, wherein the at least one of the first time parameter and the second time parameter is indicative of an average incrementing speed of the respective one of the first sharing counter and the second sharing counter.

16. The method of claim 13, further comprising, prior to the executing a spam preventive action associated with one of the first digital object and the second digital object, assessing the respective one of the first time parameter and the second time parameter associated with the respective one of the first sharing counter and the second sharing counter dedicated to the respective one of the first digital object and the second digital object.

17. The method of claim 16, wherein assessing the respective one of the first time parameter and the second time parameter associated with the respective one of the first sharing counter and the second sharing counter comprises comparing the respective one of the first time parameter and the second time parameter to a time parameter threshold value.

18. The method of claim 17, further comprising executing a spam preventive action associated with one of the first digital object and the second digital object only responsive to the respective one of the first time parameter and the second time parameter exceeding the time parameter threshold value.

19. The method of claim 17, further comprising executing a spam preventive action associated with one of the first digital object and the second digital object only responsive to the time parameter threshold value exceeding the respective one of the first time parameter and the second time parameter.

20. A server configured to detect spam activity in a cloud service, the server comprising:
 a communication interface for communication with an electronic device via a communication network, the electronic device being associated with one of a plurality of users of a cloud service provided by the server;
 an interface module;
 a user account module;
 a storage unit;
 a processor operationally connected with the communication interface, the user interface module, the user account module and the storage unit, the processor configured to cause the memory module to store a first digital object, the processor being further configured to:
  receive from a first user of the plurality of users of the cloud service an indication of a first sharing action for sharing access to the first digital object;
  responsive to the first indication, increment a first sharing counter value of a first sharing counter dedicated to the first digital object, the first sharing counter being indicative of total sharing actions associated with the first digital object across all of the user accounts of the cloud storage service;
  receive from a second user of the plurality of users of the cloud service an indication of a second sharing action for sharing access to the first digital object;
  responsive to the second indication further increment the first sharing counter value of the first sharing counter dedicated to the first digital object;
  responsive to the first sharing counter value reaching a pre-determined threshold value, execute a spam preventive action associated with the first digital object;
  and to cause the memory module to store a second digital object, the second digital object having a second sharing counter associated therewith, the second sharing counter being indicative of total sharing actions associated with the second digital object across all of the user accounts of the cloud storage service;
  and to increment the first sharing counter and the second sharing counter independently therebetween in response to sharing actions associated with their associated first digital object and second digital object.

* * * * *